(12) United States Patent
Otani et al.

(10) Patent No.: US 8,789,169 B2
(45) Date of Patent: Jul. 22, 2014

(54) MICROCOMPUTER HAVING A PROTECTION FUNCTION IN A REGISTER

(75) Inventors: Sugako Otani, Kawasaki (JP); Hiroyuki Kondo, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 307 days.

(21) Appl. No.: 12/783,252

(22) Filed: May 19, 2010

(65) Prior Publication Data
US 2010/0299751 A1   Nov. 25, 2010

(30) Foreign Application Priority Data

May 22, 2009   (JP) .................................. 2009-124244
Mar. 5, 2010   (JP) .................................. 2010-049377

(51) Int. Cl.
*G06F 21/00*   (2013.01)
(52) U.S. Cl.
USPC .................................. 726/21; 726/1; 712/208
(58) Field of Classification Search
None
See application file for complete search history.

(56) References Cited

U.S. PATENT DOCUMENTS

| | | | | |
|---|---|---|---|---|
| 5,634,046 | A * | 5/1997 | Chatterjee et al. | 712/227 |
| 5,812,868 | A * | 9/1998 | Moyer et al. | 712/23 |
| 6,666,383 | B2 | 12/2003 | Goff et al. | |
| 7,065,633 | B1 * | 6/2006 | Yates et al. | 712/227 |
| 7,111,176 | B1 * | 9/2006 | Ellison et al. | 726/34 |
| 7,171,539 | B2 * | 1/2007 | Mansell et al. | 711/203 |
| 7,185,159 | B2 * | 2/2007 | Beinet et al. | 711/163 |
| 7,305,712 | B2 * | 12/2007 | Watt et al. | 726/30 |
| 7,340,573 | B2 * | 3/2008 | Watt | 711/163 |
| 7,383,587 | B2 * | 6/2008 | Watt et al. | 726/30 |
| 2005/0114616 | A1 * | 5/2005 | Tune et al. | 711/163 |
| 2009/0259846 | A1 * | 10/2009 | Watt et al. | 713/166 |

FOREIGN PATENT DOCUMENTS

JP   2004-520662   7/2004
WO   WO 02/097612 A   12/2002

OTHER PUBLICATIONS

Ibrohimovna, Malohat; Sonia Heemstra de Groot. A Framework for Access Control and Management in Dynamic Cooperative and Federated Environments. AICT '09. Pub. Date: 2009. Relevant pp. 459-466. http://ieeexplore.ieee.org/stamp/stamp.jsp?tp=&arnumber=5072475.*
Japanese Notice of Grounds Rejection issued in Application No. 2010-049377 dated Jul. 23, 2013.

* cited by examiner

*Primary Examiner* — Cordelia Zecher
*Assistant Examiner* — Jeremiah Avery
(74) *Attorney, Agent, or Firm* — McDermott Will & Emery LLP

(57) ABSTRACT

A control unit controls execution of an instruction according to a decode result of an instruction code. A GRA register stores an access attribute for each of the plurality of general-purpose registers. A mode storage unit stores modes for controlling an operation of a CPU. When the control unit makes a request for access to the general-purpose register, register access allowance determining circuit determines whether the access to the general-purpose register in question is to be allowed or not, depending on the access attribute stored in the GRA register and the mode stored in the mode storage unit. Therefore, the number of the general-purpose registers used corresponding to the mode can be changed, and efficiency of use of the general-purpose registers can be optimized.

20 Claims, 15 Drawing Sheets

FIG.2

| b31 | b0 |
|---|---|
| R0 (SP) | |
| R1 | |
| R2 | |
| R3 | |
| R4 | |
| R5 | |
| R6 | |
| R7 | |
| R8 | |
| R9 | |
| R10 | |
| R11 | |
| R12 | |
| R13 | |
| R14 | |
| R15 | |

FIG.3

| b31 | b0 |
|---|---|
| ISP | (INTERRUPT STACK POINTER) |
| USP | (USER STACK POINTER) |
| INTB | (INTERRUPT TABLE REGISTER) |
| PC | (PROGRAM COUNTER) |
| PSW | (PROCESSOR STATUS WORD) |
| BPC | (BACKUP PC REGISTER) |
| BPSW | (BACKUP PSW REGISTER) |
| FINTV | (FAST INTERRUPT VECTOR REGISTER) |
| FPSW | (FLOATING-POINT STATUS WORD) |
| GRA | (GENERAL-PURPOSE REGISTER ATTRIBUTE) |

FIG.4

| | b31 | b30 | b29 | b28 | b27 | b26 | b25 | b24 | b23 | b22 | b21 | b20 | b19 | b18 | b17 | b16 | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|---|---|---|---|---|---|---|---|---|---|---|---|---|---|---|
| | - | - | - | - | - | IPL[2:0] | | | - | - | PM | - | - | U | I | - | - | - | - | - | - | - | - | - | - | - | - | O | S | Z | C |
| VALUE AFTER RESET | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

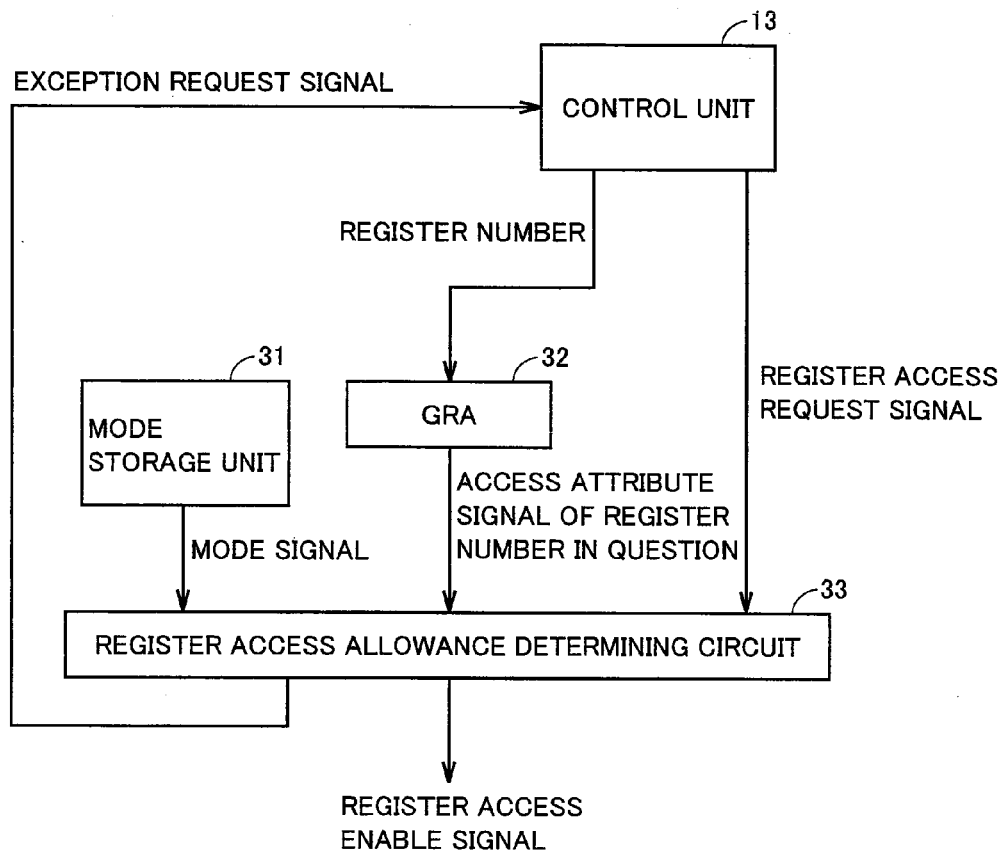

FIG.8

| INPUT SIGNAL | | | OUTPUT SIGNAL | |
|---|---|---|---|---|
| REGISTER ACCESS REQUEST SIGNAL 0:NOT REQUESTED 1:REQUESTED | MODE SIGNAL | GRA 0:PROHIBITED IN MODE 1 1:ALLOWED IN MODE 1 | REGISTER ACCESS ENABLE SIGNAL 0:NOT ACCESSED 1:ACCESSED | EXCEPTION REQUEST SIGNAL 0:NOT EXCEPTION-REQUESTED 1:EXCEPTION-REQUESTED |
| 0 | * | * | 0 | 0 |
| 1 | MODE 1 | 1 | 1 | 0 |
| 1 | MODE 1 | 0 | 0 | 1 |
| 1 | MODE 2 | 1 | 0 | 1 |
| 1 | MODE 2 | 0 | 1 | 0 |

* Don't Care

[KIND OF ACCESS]
00: R/W ACCESS PROHIBITED
01: W ACCESS ALLOWED
10: R ACCESS ALLOWED
11: R/W ACCESS ALLOWED

FIG.19A  ADD R1, R2  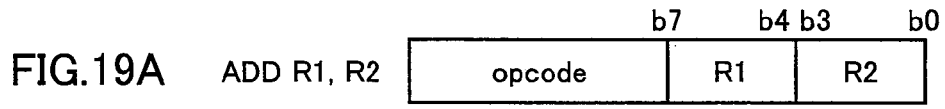
FIG.19B  MUL R1, R2  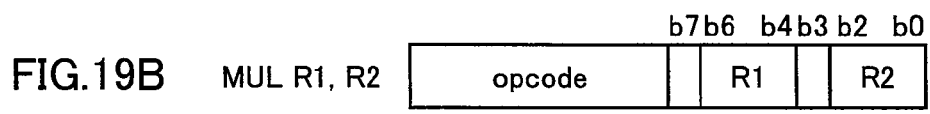
FIG.20
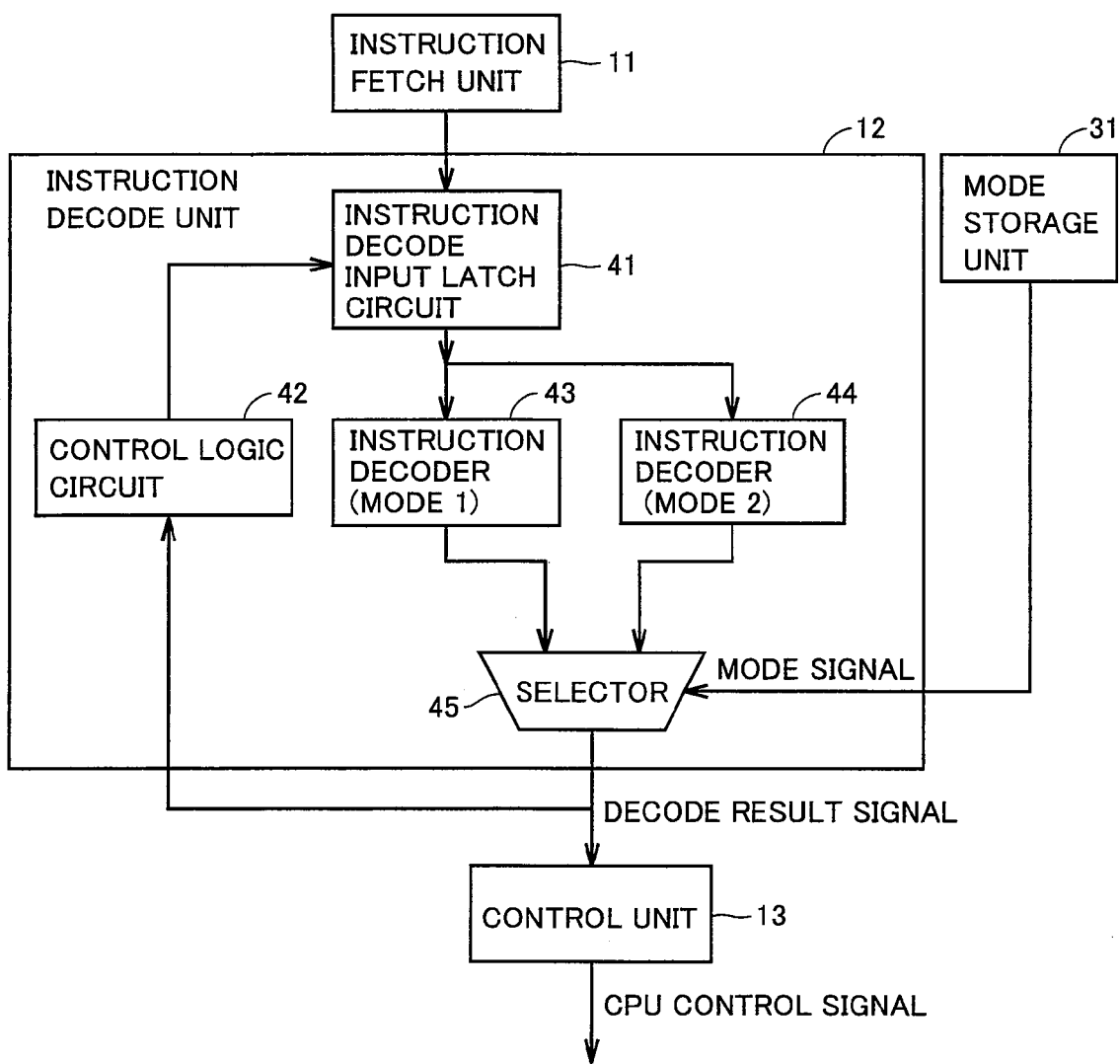

MICROCOMPUTER HAVING A PROTECTION FUNCTION IN A REGISTER

BACKGROUND OF THE INVENTION

1. Field of the Invention

The present invention relates to a microcomputer, and particularly to a microcomputer having a protection function in a register.

2. Description of the Background Art

In recent years, performances of microcomputers have advanced, and functions thereof have also increased in number. For increasing a processing speed of such a microcomputer, it may employ a manner in which a bank structure is formed by arranging two or more general-purpose registers. For example, a structure having two banks is configured to use a bank-0 register by an application program and to use a bank-1 register by an interrupt processing routine.

When an interrupt occurs when a CPU (Central Processing Unit) using the bank-0 register is executing processing of an application program, it switches the register to the bank-1 register to execute the interrupt processing routine. Thereby, it is not necessary to save contents of the register in a slow memory (stack area), and the interrupt processing can be started fast. Likewise, fast switch or change can be performed when the processing returns from the interrupt processing routine to the application program.

As a technique related to the above, there is an invention disclosed in Japanese Patent Laying-Open No. 2004-520662 (which will be referred as a "Patent Document 1" hereinafter). The Patent Document 1 relates to a processor having many registers in a register bank. The resisters have general-purpose registers having a common register name as well as stack point registers. The processor executes a program instruction referring to the common register name, and therefore it has a logic corresponding to programming. This instruction is executed by using the general-purpose register under a first condition and by using the stack point register under a second condition. Therefore, the plurality of registers identified by the same name can be selectively accessed based on the establishment of a specific condition.

As described above, the use of the bank register allows fast change to the interrupt processing routine as well as fast return from the interrupt processing routine. However, bank-0 registers used by the application program that performs many operations and requires a long processing time are equal in number to bank-1 registers used by the interrupt processing routine that requires a short processing time. Therefore, there is a difference in use efficiency between the registers used by the application program and the registers used by the interrupt processing routine, resulting in a problem that optimization with respect to details of the processing is not performed.

Further, the general-purpose registers occupy a large part of hardware quantity of the CPU. Therefore, the above bank register structure results in problems of a large chip area and high manufacturing cost.

In many cases, the operation mode of the interrupt processing is a privilege mode or the like higher in execution privilege than that for executing an ordinary user program, and there is no protection function for the bank register used by the interrupt processing routine. Therefore, there is a risk that contents of the bank register used by the interrupt processing routine are unintentionally rewritten by an application program or a malicious program. Therefore, the conventional CPU suffers from a problem relating to secure use.

SUMMARY OF THE INVENTION

An object of the invention is to provide a microcomputer that can optimize efficiency of use of general-purpose registers and can provide a protection function for the general-purpose registers.

An embodiment of the invention provides a microcomputer including a microprocessor that executes an instruction while accessing a plurality of general-purpose registers. A control unit controls execution of an instruction according to a result of decoding of an instruction code. A GRA register stores an access attribute with respect to each of the plurality of general-purpose registers. A mode storage unit stores a mode for controlling an operation of a CPU. When the control unit requests access to the general-purpose registers, a register access allowance determining circuit determines whether the access to the general-purpose register in question is to be allowed or not, based on the access attribute stored in the GRA register and the mode stored in the mode storage unit.

In this embodiment, it is determined whether the access to the general-purpose register is to be allowed or not, based on the access attribute stored in the GRA register and the mode stored in the mode storage unit. Therefore, the number of the general-purpose registers to be used can be changed according to the mode, and the efficiency of use of the general-purpose registers can be optimized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an example of a general-purpose register group included in a general-purpose register file 16.

FIG. 3 shows an example of a control register group included in a control register file 17.

FIG. 4 illustrates allocation of respective bits of a PSW.

FIG. 6 shows an example of a circuit structure for controlling access to the general-purpose registers according to the GRA register.

FIG. 7 shows an example of logic of a register access allowance determining circuit 33.

FIG. 8 illustrates another example of the logic of register access allowance determining circuit 33.

FIGS. 19A and 19B illustrates an example of the case where the instruction codes of the same bit pattern are interpreted as different instructions depending on the mode, respectively.

FIG. 20 illustrates a structural example of an instruction decode unit of a microcomputer according to a seventh embodiment of the invention.

DESCRIPTION OF THE PREFERRED EMBODIMENTS

First Embodiment

Figure 1:
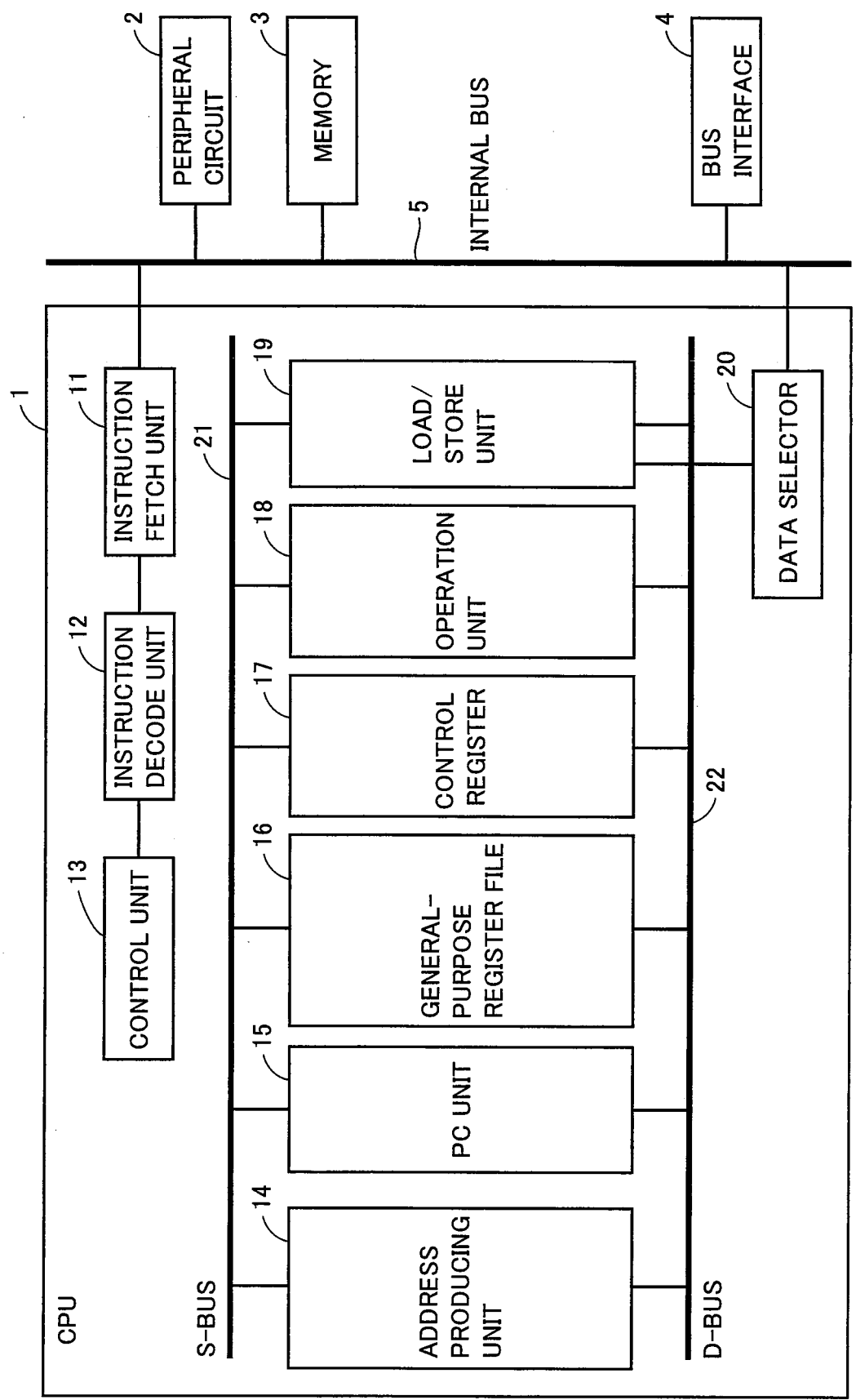
FIG. 1 is a block diagram showing a schematic structure of a microcomputer according to a first embodiment of the invention.

FIG. 1 is a block diagram showing a schematic structure of a microcomputer according to a first embodiment of the invention. This microcomputer includes a CPU 1, a peripheral circuit 2, a memory 3 and a bus interface 4, which are connected together via an internal bus 5. CPU 1 can access a memory or peripheral device outside the microcomputer via bus interface 4 connected to internal bus 5.

CPU 1 includes an instruction fetch unit 11, an instruction decode unit 12, a control unit 13, an address producing unit 14, a PC (Program Counter) unit 15, a general-purpose register file 16, a control register file 17, an operation unit 18, a load/store unit 19 and a data selector 20, each of which is connected to an internal bus, an S-bus 21 and a D-bus 22. Via these buses, the above portions can transmit and receive data, address, control signal and others.

Instruction fetch unit 11 operates according to a program counter value of PC unit 15 to fetch the instruction code stored in memory 3, to fetch the instruction code stored in the memory (not shown) outside the microcomputer through bus interface 4 and to provide the instruction code to instruction decode unit 12.

Instruction decode unit 12 provides the instruction decode received from instruction fetch unit 11 to an internal instruction decoder. The instruction decoder decodes the instruction decode, and provides a result of the decoding to control unit 13.

According to the decode result received from instruction decode unit 12, control unit 13 controls various portions of CPU 1 to control and manage the operation of CPU 1. FIG. 1 does not show the control signals provided from control unit 13 to various portions.

When instruction decode unit 12 decodes a branch instruction, address producing unit 14 calculates a branch destination address according to an addressing mode. When a branching condition is satisfied, the calculated branch destination address is set in PC unit 15.

Under the control of control unit 13, operation unit 18 performs the operation processing on the data stored in the general-purpose register, the data read from memory 3, the data read through bus interface 4 from the memory outside the microcomputer and others. Results of the operation processing are written into the general-purpose register, memory 3, the memory outside the microcomputer and the like.

Load/store unit 19 writes the operation result provided by operation unit 18 in memory 3 or the memory outside the microcomputer, and reads the data from memory 3 or the memory outside the microcomputer. In this operation, load/store unit 19 produces an operand access address, and provides it to memory 3 or the memory outside the microcomputer via data selector 20.

Data selector 20 selects the operand access address and the write data provided from load/store unit 19 for providing it onto internal bus 5, and provides the read data received through internal bus 5 to load/store unit 19.

FIG. 2 shows an example of the general-purpose register group included in general-purpose register file 16. General-purpose register file 16 is formed of 16 general-purpose registers R0-R15, each of which has a width of 32 bits.

In addition to the function as the general-purpose register, a function as a Stack Pointer (SP) is allocated to general-purpose register R0. This SP can selectively change into an Interrupt Stack Pointer (ISP) and a User Stack Point (USP) according to U bits of a PSW (Processor Status Word) register to be described later.

FIG. 3 shows an example of the control register group included in control register file 17. The Interrupt Stack Pointer (ISP) is a register for setting the value of the stack pointer used in the interrupt processing routine. The User Stack Pointer (USP) is a register for setting the value of the stack pointer used by the user (application program).

The interrupt table (INTB) register is a register for setting a top address of a variable vector table. The Program Counter (PC) is a register for indicating an address of an instruction that is being executed.

The Processor Status Word (PSW) is a register indicating a status of the processor, and details of the PSW will be described later.

Backup PC (BPC) register is a register that saves the value of the Program Counter (PC) when fast interrupt occurs. The Backup PSW (BPSW) register is a register that saves the value of the Processor Status Word (PSW) when the fast interrupt occurs. The fast interrupt vector (FINTV) register is a register for setting the branch destination address (start address of the fast interrupt processing routine) when the fast interrupt occurs.

The fast interrupt is a function that increases a speed of the interrupt processing performed by CPU 1, and can handle a specific interrupt factor as a fast interrupt target. When this specific interrupt factor occurs, CPU 1 saves the values of PC and PSW in BPC register and BPSW register, respectively, and obtains the branch destination address from the FINTV register. Thereby, it is not necessary to save the values of the PC and the PSW in the stack, and it is not necessary to obtain the interrupt vector address from the memory so that CPU 1 can start the interrupt processing rapidly.

A Floating-Point Status Word (FPSW) register is a register indicating a status of a floating-point arithmetic unit. This register is not particularly related to the invention, and therefore is not specifically described.

General-purpose Register Access attribute (GRA) register is a register for setting the access control of general-purpose registers R0-R15 as will be described later. This register will be described later in detail.

FIG. 4 shows allocation of respective bits of the PSW. C-flag (carry flag), Z-flag (zero flag), S-flag (sign flag) and O-flag (overflow flag) are allocated to respective bits 0-3 of the PSW.

An interrupt allowing bit (I-bit) is allocated to a bit 16 of the PSW for setting prohibition/allowance of the interrupt.

A stack point indication bit (U-bit) is allocated to a bit 17 of the PSW for indicating the interrupt stack pointer (ISP) as the SP when it is "0", and indicating the user stack point (USP) as the SP when it is "1". When an exception is accepted, this bit becomes "0". When the mode changes from a supervisor mode to a user mode, this bit becomes "1".

A processor mode indication bit (PM bit) is allocated to a bit 20 of the PSW so that the processor mode is set to the supervisor mode when it is "0", and is set to the user mode when it is "1".

Processor interrupt priority levels (IPL[2:0]) are allocated to bits 24, 25 and 26 of the PSW so that processor interrupt priority levels at eight priority levels from 0 to 7 can be specified. When the priority level of the requested interrupt is higher than the priority level of the processor interrupt, this interrupt is allowed.

Figure 5:
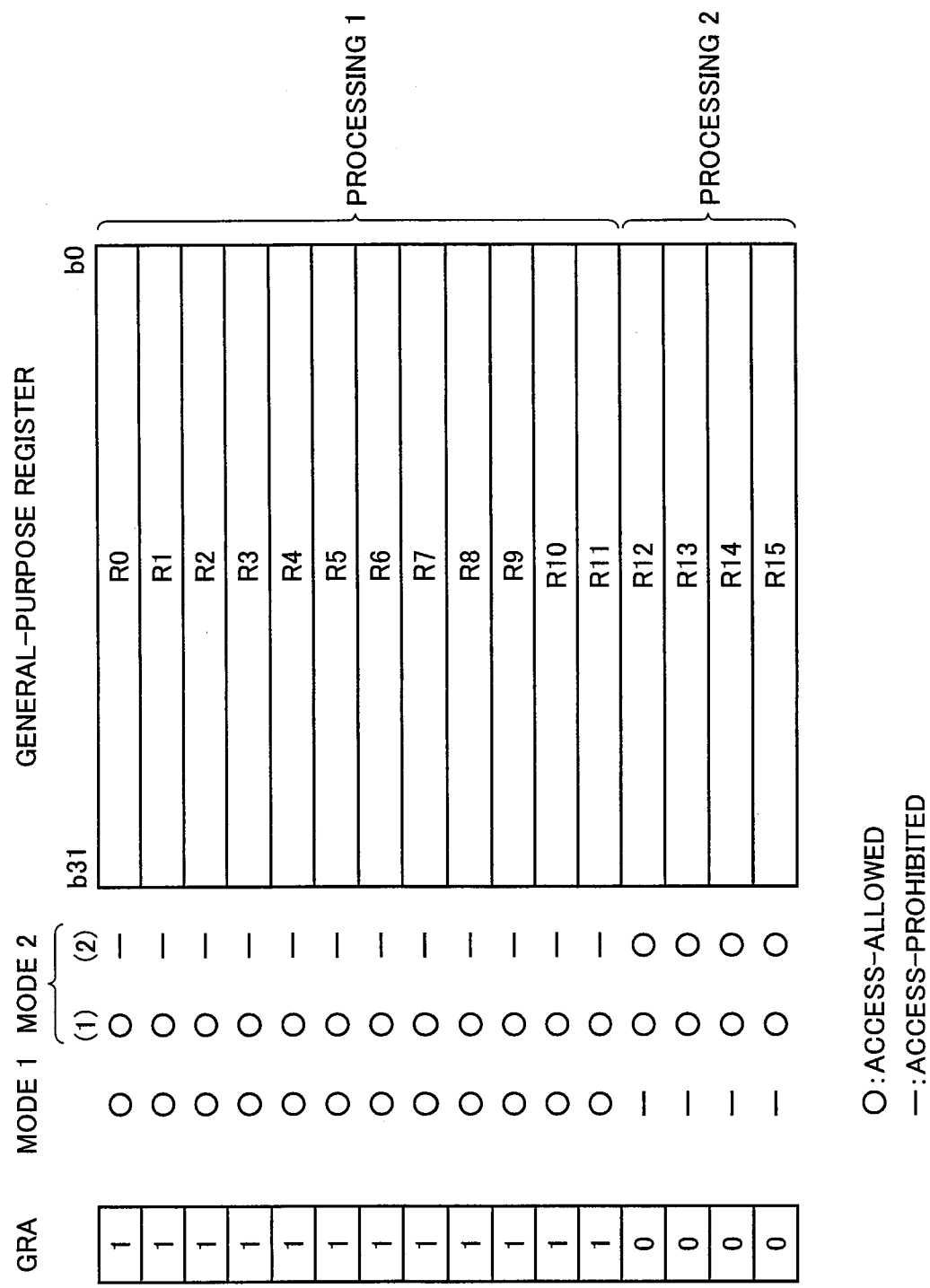
FIG. 5 illustrates a manner in which access control of general-purpose registers R0-R15 is performed according to a GRA register.

FIG. 5 illustrates a manner in which the access control of general-purpose registers R0-R15 is performed according to the GRA register. The access to general-purpose registers R0-R15 depends on the contents of the GRA register and the mode. This mode indicates a broad concept including the foregoing processor mode, and is not restricted to the processor mode.

As shown in FIG. 5, a mode 1 allows the access to the general-purpose register corresponding to the bit in the GRA register that is set to "1", and prohibits the access to the general-purpose register corresponding to the respective bit that is set to "0". When the mode changes from mode 1 to a mode 2, two patterns are supported.

In the first pattern, when the mode changes to mode 2, the access to all the general-purpose registers is allowed (see (1) in FIG. 5). In the second pattern, when the mode changes to mode 2, the access to the general-purpose registers to which access was allowed in mode 1 is prohibited, and the access to the general-purpose registers to which access was prohibited in mode 1 is allowed (see (2) in FIG. 5).

In the case of (2) in FIG. 5, such a bit may be additionally employed that instructs the GRA register to generate non-maskable interrupt or the like or to ignore it when the access is made to the general-purpose register in the access-prohibited state.

FIG. 6 shows an example of a circuit structure for controlling the access to the general-purpose registers according to the GRA register. A mode storage unit 31 stores information indicating the current mode. For example, when the mode corresponds to the foregoing processor mode, the value of the PM in the PSW register is set in mode storage unit 31.

When control unit 13 analyzes the decode result received from instruction decode unit 12 and detects the fact that an instruction requiring the access to the general-purpose register is decoded, control unit 13 provides a register number of the general-purpose register in question to a GRA register 32, and provides a register access request signal to a register access allowance determining circuit 33.

GRA register 32 provides, as the access attribute signal, the contents of the bit corresponding to the register number received from control unit 13 to register access allowance determining circuit 33.

Based on the register access request signal provided from control unit 13, a mode signal provided from mode storage unit 31 and an access attribute signal provided from GRA register 32, register access allowance determining circuit 33 issues a register access enable signal to the general-purpose register of the corresponding number. When the access request is made for the general-purpose register to which access is prohibited by control unit 13, register access allowance determining circuit 33 provides an exception request signal to control unit 13.

FIG. 7 shows an example of logic of register access allowance determining circuit 33. The logic shown in FIG. 7 shows the case where the access to all the general-purpose registers is allowed in mode 2. This corresponds to the first pattern ((1) in FIG. 5) in the case of change to mode 2 already described with reference to FIG. 5.

When control unit 13 has not made the register access request (i.e., when the register access request signal is "0"), "0" (no access) is issued as the register access enable signal regardless of the mode signal provided from mode storage unit 31 and the access attribute signal provided from GRA register 32. In this case, the exception request is not issued.

When control unit 13 makes the register access request (the register access request signal is "1"), the mode signal provided from mode storage unit 31 indicates "mode 1" and the access attribute signal provided from GRA register 32 indicates the access-allowance (the access attribute signal is "1"), register access allowance determining circuit 33 provides the register access enable signal of "1" (access) to the corresponding general-purpose register. In this case, the exception request is not issued.

When control unit 13 makes the register access request (the register access request signal is "1"), the mode signal provided from mode storage unit 31 indicates "mode 1" and the access attribute signal provided from GRA register 32 indicates the access prohibition (the access attribute signal is "0"), register access allowance determining circuit 33 provides the register access enable signal of "0" (no access) to the corresponding general-purpose register. In this case, register access allowance determining circuit 33 provides the exception request signal of "1" to issue the exception request.

When control unit 13 makes the register access request (the register access request signal is "1") and the mode signal provided from mode storage unit 31 indicates "mode 2", register access allowance determining circuit 33 provides the register access enable signal of "1" (access) to the corresponding general-purpose register regardless of the access attribute signal provided from GRA register 32. In this case, the exception request is not issued.

FIG. 8 illustrates another example of the logic of register access allowance determining circuit 33. The logic shown in FIG. 8 shows the case where the access to the general-purpose register to which access was allowed in mode 1 is prohibited, and the general-purpose register to which access was prohibited in mode 1 is allowed when the mode changes to mode 2. This corresponds to the second pattern ((2) in FIG. 5) in the case of change to mode 2 already described with reference to FIG. 5. When control unit 13 has not made the register access request, and when the mode signal provided from mode storage unit 31 indicates "mode 1", the logic is substantially the same as that shown in FIG. 7.

When control unit 13 makes the register access request (the register access request signal is "1"), the mode signal provided from mode storage unit 31 indicates "mode 2" and the access attribute signal provided from GRA register 32 indicates the access-allowance (the access attribute signal is "1"), register access allowance determining circuit 33 provides the register access enable signal of "0" (no access) to the corresponding general-purpose register. In this case, register access allowance determining circuit 33 provides the exception request signal of "1" to issue the exception request.

When control unit 13 makes the register access request (the register access request signal is "1"), the mode signal provided from mode storage unit 31 indicates "mode 2" and the access attribute signal provided from GRA register 32 indicates the access prohibition (the access attribute signal is "0"), register access allowance determining circuit 33 provides the register access enable signal of "1" (access) to the corresponding general-purpose register. In this case, the exception request is not issued.

Figure 9:
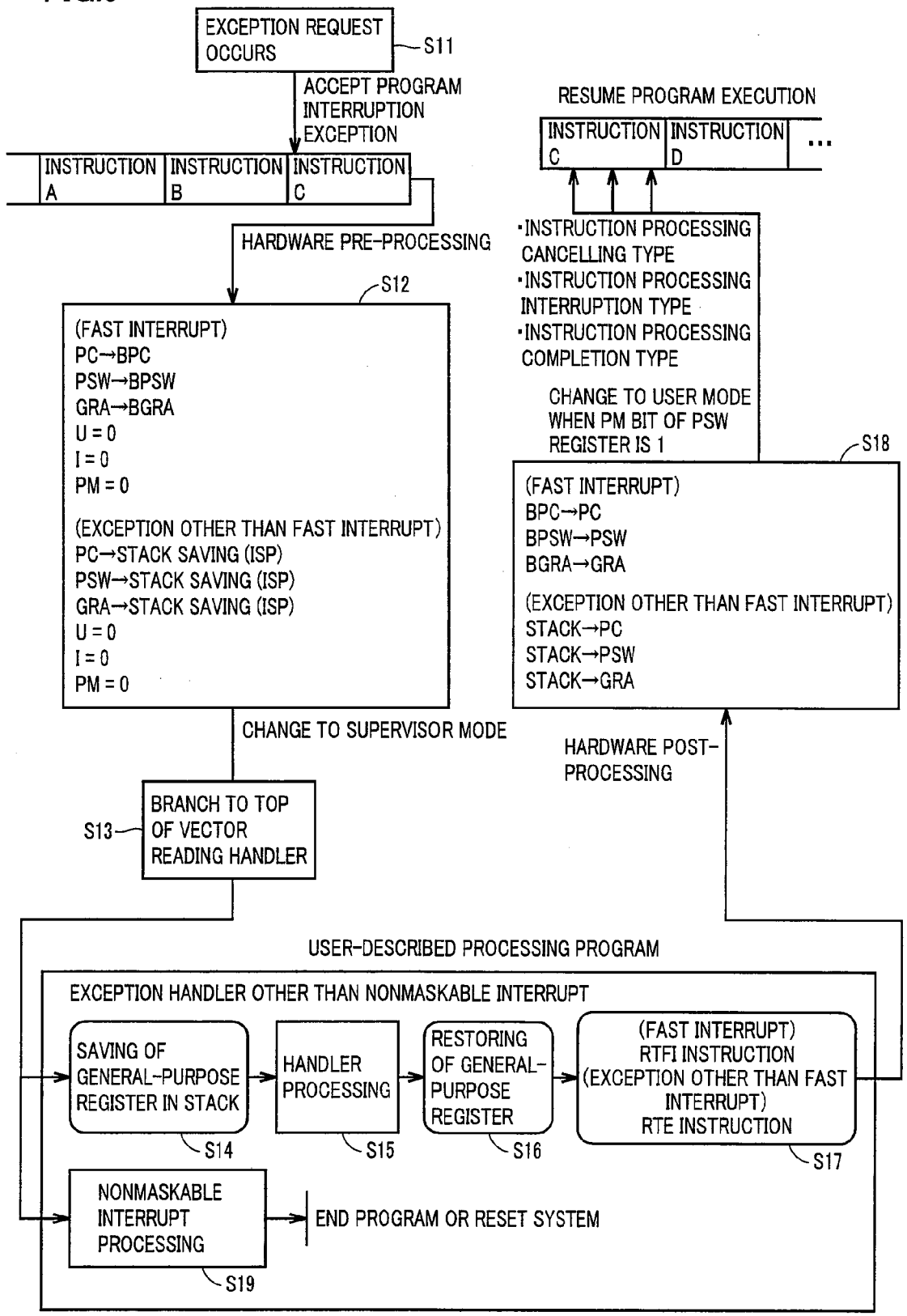
FIG. 9 is a flowchart for illustrating an example of an interrupt sequence in the case where an exception request occurs.

FIG. 9 is a flowchart for illustrating an example of an exception processing sequence in the case where the exception request occurs. In FIG. 9, mode 1 corresponds to the user mode, and mode 2 corresponds to a privilege mode (supervisor mode). Usually, the application program operates in the user mode, and the mode will change to the privilege mode when an exception such as interrupt occurs or when CPU 1 executes a change instruction for change to the privilege mode.

When the exception request occurs in an instruction C (S11) while CPU 1 is executing an application program, hardware pre-processing is executed (S12). Hardware automatically executes this processing when CPU 1 receives the exception request.

In the case of the fast interrupt, the contents of the PC, PSW and GRA registers are saved in BPC, BPSW and BGRA registers, respectively, "0" is set in each of U, I and PM bits in the PSW register, and the mode changes to the supervisor mode.

In the case other than the fast interrupt, the contents of the PC, PSW and GRA registers are saved in the stack areas at the addresses indicated by the ISP, respectively, "0" is set in each of U, I and PM bits in the PSW register and the mode changes to the supervisor mode.

Then, CPU 1 reads the vector address to branch to the top address of the handler (S13). Thus, in the case of the fast interrupt, CPU 1 obtains the branch destination address that is set in the FINTV register to branch to the top address of the handler. In the case other than the fast interrupt, it refers to the contents of the INTB register to obtain the branch destination address stored in the memory, and branches to the top address of the handler.

CPU 1 automatically performs the processing in steps S11-S13, but performs the processing in steps S14-S17 or S19 by executing a processing program described by the user.

In the case of the exception handler other than the non-maskable interrupt, the contents of the general-purpose register are first saved in the stack area (S14). For saving the contents of the general-purpose register in the stack area, the configuration offers an option of performing the stack saving processing by a saving mechanism arranged as hardware of the microcomputer or by software.

Then, handler processing is performed (S15), and the saved contents of the general-purpose register are restored (S16). A return instruction described at the end of the exception handler is executed (S17), and the process proceeds to a step S18. In the case of the fast interrupt, an RTFI instruction is described. In the case other than the fast interrupt, an RTE instruction is described.

In the case of the nonmaskable interrupt, the nonmaskable interrupt processing is executed (S19) to end the program or to reset the system.

Hardware post-processing is executed in step S18. This processing is automatically performed by the hardware when CPU 1 executes the RTFI instruction or the RTE instruction.

In the case of the fast interrupt, the contents of the BPC, BPSW and BGRA registers are restored to the PC, PSW and GRA registers, respectively. When the PM bit of the PSW register is "1" at this point in time, the mode changes to the user mode.

In the case other than the fast interrupt, the contents saved in the stack area are restored to the PC, PSW and GRA registers. When the PM bit of the PSW register is "1", the mode changes to the user mode.

As shown in FIG. 9, the acception timing and the value of the saved PC vary depending on the exception event. In an instruction processing canceling type such as undefined instruction exception, privilege instruction exception or floating-point exception, the exception is accepted during the execution of an instruction C, and a PC value of the instruction that generated the exception is saved. Therefore, execution of the program is resumed from instruction C.

In an instruction processing interruption type, e.g., in such a case that nonmaskable interrupt or ordinary interrupt occurs during execution of a specific instruction, the exception is accepted during the execution of instruction C, and the PC value of the instruction that is being executed is saved. Therefore, execution of the program is resumed from instruction C.

In an instruction processing completion type such as an unconditional trap that occurs when the INT instruction or the BRK instruction is executed, the exception is accepted after instruction C is executed, and the PC value of the next instruction is saved. Therefore, execution of the program is resumed from the instruction following instruction C.

Figure 10:
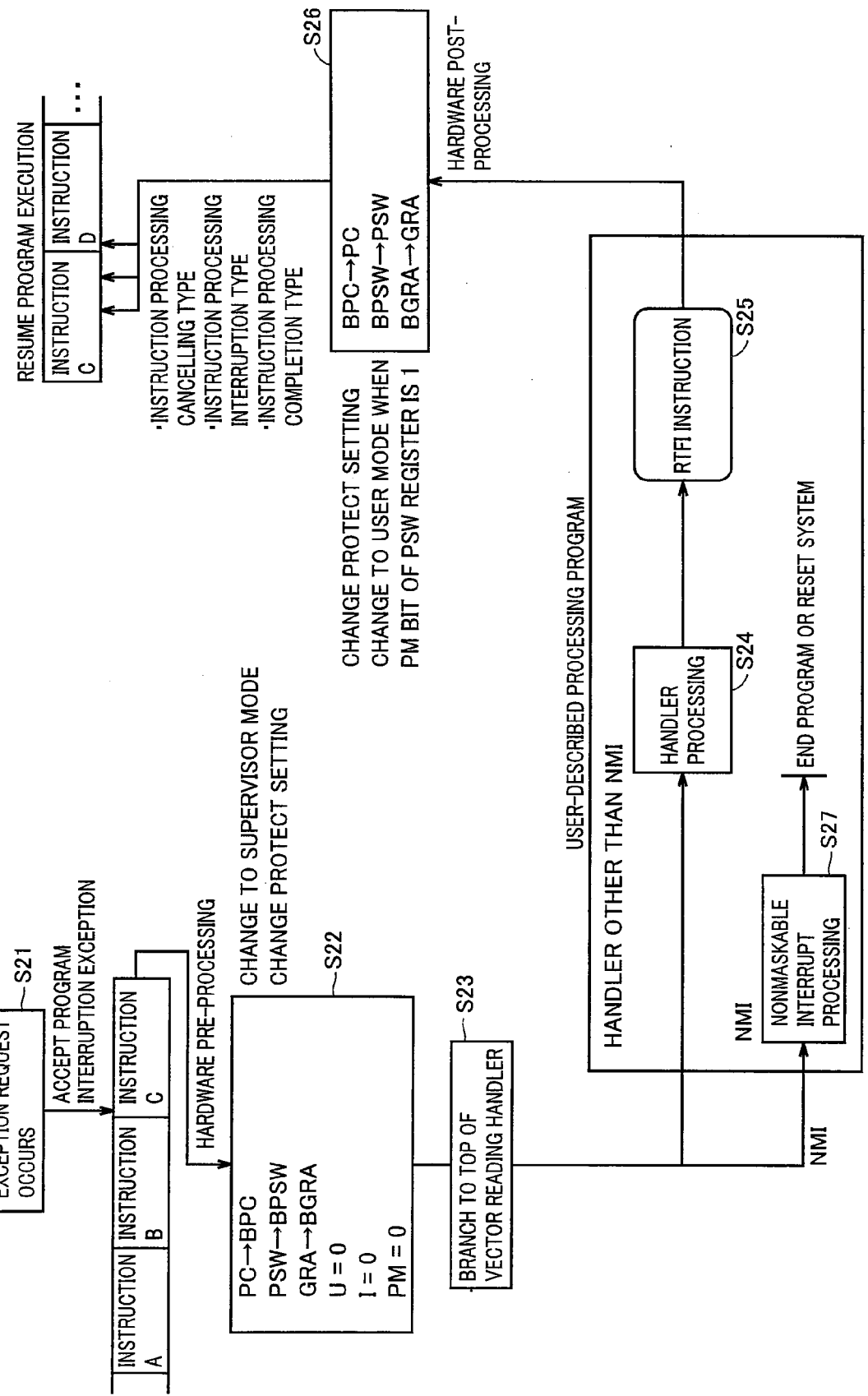
FIG. 10 is a flowchart for illustrating another example of the interrupt sequence used when the exception request occurs.

FIG. 10 is a flowchart for illustrating another example of the interrupt sequence executed when the exception request occurs. When the exception request occurs in instruction C (S21) while CPU 1 is executing the application program (during the operation in the user mode), hardware pre-processing is executed (S22). The hardware automatically performs this processing when CPU 1 receives the exception request.

In the case of the fast interrupt, the contents of the PC register and the PSW register are saved in the BPC register and the BPSW register, respectively, "0" is set at each of the U, I and PM bits in the PSW register, and the mode changes to the supervisor mode.

In the case other than the fast interrupt, respective contents of the PC register and the PSW register are saved in the stack area at the addresses designated by the ISP, "0" is set at each of the U, I and PM bits in the PSW register, and the mode changes to the supervisor mode. In response to the change of the operation mode of the CPU from the user mode to the supervisor mode, general-purpose registers R0-R11 that were enabled in the user mode are disabled in the supervisor mode according to the pattern illustrated at (2) in FIG. 5, and also general-purpose registers R12-R15 that were disabled in the user mode are enabled in the supervisor mode.

Then, CPU 1 reads out the vector address, and branches to the top address of the handler (S23).

CPU 1 automatically performs the processing in steps S21-S23, but performs the processing in steps S24 and S25, or S27 by executing the processing program described by the user.

Then, the exception handler processing is performed (S24). The exception handler is described to perform the processing by using only general-purpose registers R12-R15. In the patter of (2) in FIG. 5, this description allows the processing to be executed in response to the interrupt while keeping the execution state of the program in the user mode that was being executed before the interrupt. Also, it becomes unnecessary to save general-purpose registers R0-R11 in the stack area.

However, in the case of the pattern at (1) in FIG. 5, when the mode changes to the supervisor mode in step S22, whether general-purpose registers R0-R11 is to be saved in the stack area or not depends on the description of the program in the exception handler processing.

Selection of the pattern from among those at (1) and (2) in FIG. 5 is performed as follows. For example, the pattern at (1) in FIG. 5 can be employed when the processing in the exception handler is relative large in quantity and further the processing of saving the general-purpose registers in the stack areas is relatively smaller as the overhead, or when existing exception handler performing the processing of saving the general-purpose registers in the stack areas is used.

Conversely, the pattern at (2) in FIG. 5 can be employed when the processing in the exception handler is relatively small and the processing of saving the general-purpose registers in the stack areas is relatively large as the overhead, or when the real-time practicability of the user program is high. In this case, the GRA register may be indicated to ignore the access to the access prohibition register. Thereby, even when the exception handler contains the processing of saving the general-purpose register in the stack, it is impossible to save the general-purpose register in the stack area because the access to general-purpose registers R0-R11 is disabled, and the stack area saving processing of the general-purpose register is resolved as the overhead.

By allowing the above selection, it becomes possible to reduce the overhead that is the stack saving of the general-purpose register in the exception handler performing relatively light processing, and to preserve the execution state of the user program that is being executed, while maintaining the usability or applicability of the existing program.

A return instruction that is described at the end of the exception handler is executed (S25), and the process proceeds to a step S26.

In the case of the nonmaskable interrupt, the nonmaskable interrupt processing is executed (S31), and the program ends or the system reset is performed.

In step S26, hardware post-processing is executed. The hardware automatically performs this processing when CPU 1 executes the RTFI instruction or the RTE instruction.

In the case of the fast interrupt, the contents of the BPC register and the BPSW register are restored to the PC register and the PSW register, respectively. When the PM bit of the PSW register is "1" at this point in time, the mode changes to the user mode.

In the case of the exception other than the fast interrupt, the contents saved in the stack area are restored to the PC register and the PSW register. When the PM bit of the PSW register is "1" at this point in time, the mode changes to the user mode.

Figure 11:
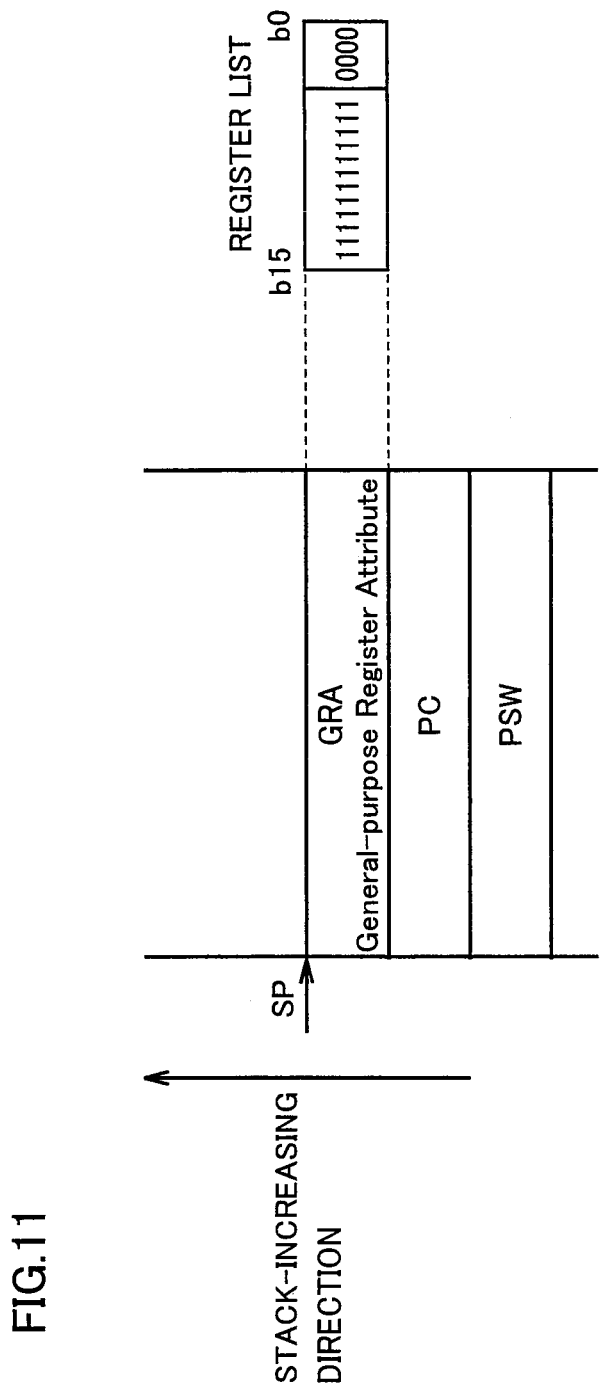
FIG. 11 shows a stack saving image of CPU context.

FIG. 11 shows the stack saving image of the CPU context. As described above, the values of the PC, PSW and GRA registers are stored in the stack area when the exception other than the fast interrupt occurs. As shown in FIG. 11, these values are successively saved in the stack area, and the value of SP is incremented or decremented in a direction of an arrow. For restoring values saved in the stack area, the value of the SP is decremented or incremented in the direction opposite to the arrow.

Figure 12:
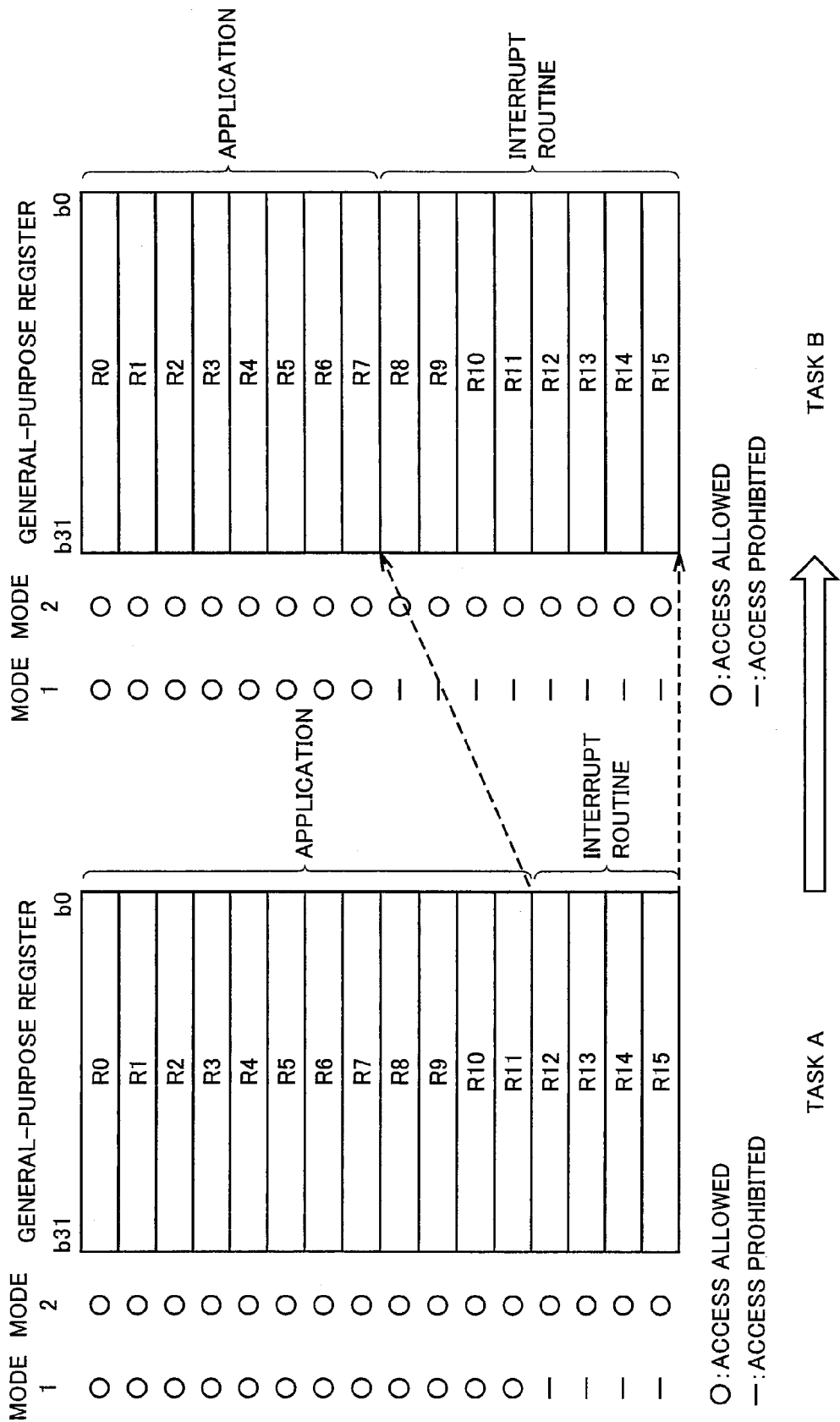
FIG. 12 illustrates the case where the number of access-allowed registers changes depending on a task.

FIG. 12 illustrates the case where the number of registers of which access is allowed changes according to a task. In general, the processing of the task is formed of an application program and an interrupt processing routine. In FIG. 12, mode 1 corresponds to the application program, and mode 2 corresponds to the interrupt processing routine. Mode 2 corresponds to the manner at (1) in FIG. 5 already described. The task switch processing by the OS will not be described.

In a task A, since an application processing scale is large, 12 general-purpose registers R0-R11 are assigned to the application program. Also, 4 general-purpose registers R12-R15 are assigned to the interrupt processing routine. Since the access to four general-purpose registers R12-R15 from an application program is prohibited, these general-purpose registers R12-R15 can be prevented from being unintentional rewriting by an application program or an malicious program.

In a task B, since an importance in the processing details is placed on the interrupt processing speed, eight general-purpose registers R0-R7 are assigned to the application program, and eight general-purpose registers R8-R15 are assigned to the interrupt processing routine. The access to eight general-purpose register R8-R15 from the application program is prohibited.

In the microcomputer according to the embodiment, as described above, the general-purpose registers to which access is to be allowed in mode 1 as well as the general-purpose registers to which access is to be prohibited in mode 1 are set in the GRA register, and the access to the general-purpose registers to which access was prohibited in mode 1 is allowed in mode 2. Therefore, the number of the registers assigned to mode 2 (interrupt processing routine) can be optimized for each task.

Since the access from mode 1 (application program) to the general-purpose registers that are assigned to mode 2 (interrupt processing routine) is prohibited, it becomes possible to implement the so-called register protection function that prevents the unintentional rewriting by the application program or the malicious program.

Since it is not necessary to employ the bank-register structure, the number of the general-purpose registers can be reduce. Therefore, increase in chip area and increase in manufacturing cost can be prevented.

Second Embodiment

In the microcomputer according to the second embodiment of the invention, a hierarchical protection function (ring protection) is implemented by supporting a privilege level. In the following description, three privilege levels 0-2 are supported, but this is not restrictive. Four or more privilege levels may be employed. The privilege level 0 provides the highest privilege, and the privilege level 1 provides a higher privilege than the privilege level 2.

A schematic structure of a microcomputer, a logical structure of register access allowance determining circuit 33 and the like in the second embodiment of the invention are substantially the same as those already described in the first embodiment. Therefore, detailed description of the structures and functions already described will not be repeated.

Figure 13:
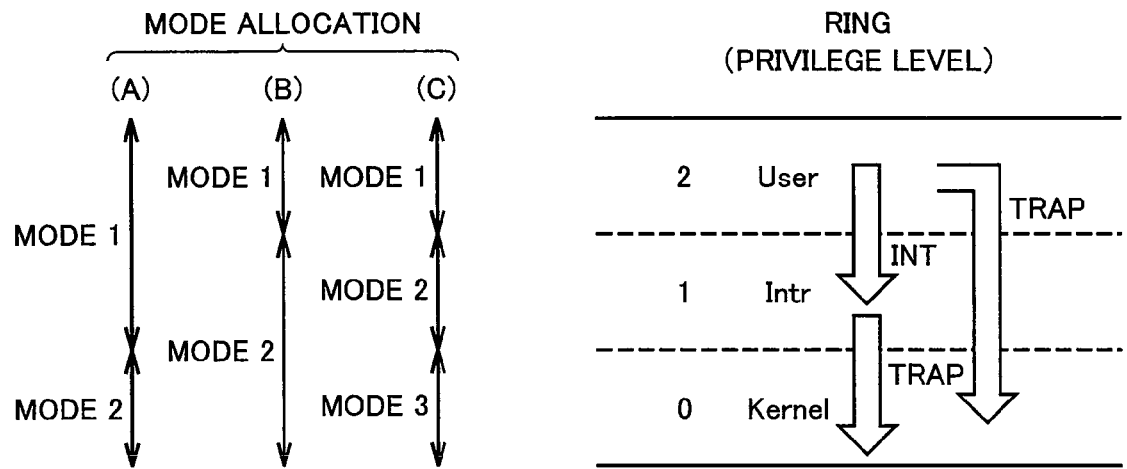
FIG. 13 illustrates a privilege level of a microcomputer according to a second embodiment of the invention.

FIG. 13 illustrates a privilege level of the microcomputer according to the second embodiment of the invention. As illustrated in FIG. 13, a kernel (OS) is arranged at the privilege level 0, an interrupt processing routine is arranged at the privilege level 1 and an application program (user program) is arranged at the privilege level 2. Allowed operations such as resource access and the kinds of executable instructions are defined for each level. For example, the application program at the level 2 is allowed only to access a specific memory area and to execute a specific instruction.

For example, the change from the privilege level 2 to the privilege level 1 is performed by the interrupt (INT). Also, the change from the privilege level 2 to the privilege level 1 is performed by trap that occurs when the INT instruction or BRK instruction is executed. Thus, specific exception factors are allocated to the change between the specific privilege levels.

At (A), FIG. 13 shows the case where the application program and the interrupt processing routine are allocated to mode 1, and the kernel (OS) is allocated to mode 2. This allows fast switching from the application program or the interrupt processing routine to the OS, and protects the resource including the general-purpose registers used by the OS.

At (B), FIG. 13 shows the case where the application program is allocated to mode 1, and the interrupt processing routine and the kernel (OS) are allocated to mode 2. This allows fast switching between the application program and the interrupt processing routine, and protects the resource including the general-purpose registers used by the interrupt processing routine and the OS.

At (C) in FIG. 13, when the mode changes to mode 2 as shown at (2) in FIG. 5, the access to the general-purpose registers to which access was allowed in mode 1 is prohibited, and the access to the general-purpose registers to which access is prohibited in mode 1 is allowed. Thereby, the general-purpose registers used by the application program become exclusive with the general-purpose registers used by the interrupt processing routine. This can prevent the destruction of the application program even when the interrupt processing routine runs away.

Such a configuration may be employed that the access to the GRA register is allowed at the privilege level 0, and the access to the GRA register is prohibited at the privilege levels 1 and 2. This configuration can implement more effectively the function of protecting the general-purpose registers used by the OS.

Figure 14:
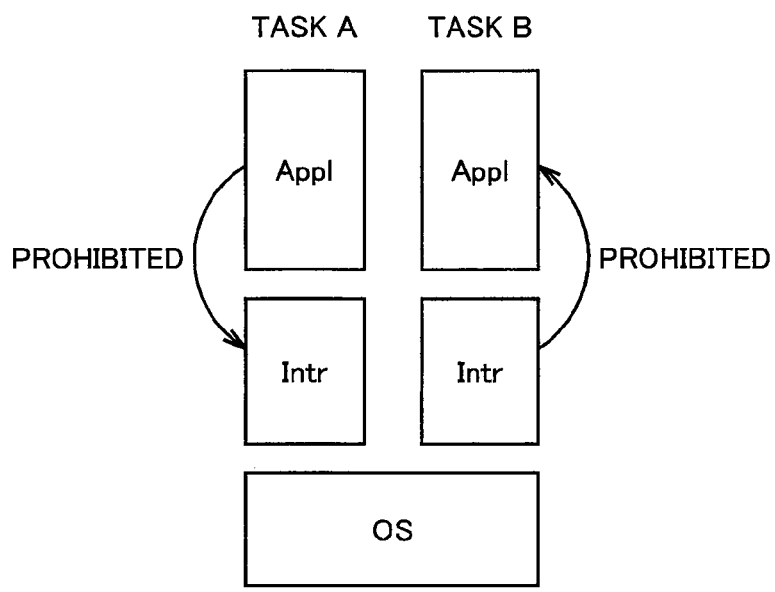
FIG. 14 shows an example of a software structure implemented by a microcomputer according to the second embodiment of the invention.

FIG. 14 shows an example of a software structure executed by the microcomputer according to the second embodiment of the invention. In FIG. 14, the tasks A and B are running on the OS.

The task A indicates that the access to the general-purpose registers that is used by the interrupt processing routine is prohibited even when the application program runs away, or when the application program is a malicious program. This can be implemented in either of the cases where the register access allowance determining circuit has the logic shown in FIGS. 7 and 8, respectively.

However, since the access to all the general-purpose registers is allowed for the interrupt processing routine when the logic shown in FIG. 7 is employed, there is a possibility that the application program may de destroyed when the interrupt processing routine runs away.

Task B indicates that the access to the general-purpose register that is used by the application program is prohibited even when the interrupt processing routine runs away. This can be implemented by the register access allowance determining circuit that has the logic shown in FIG. 8 and is configured to make the general-purpose registers used by the application program exclusive with the general-purpose registers used by the interrupt processing routine.

When task B is a user program related to the security, e.g., an encryption processing program, an attack may be performed for unfairly obtaining an decryption key for decoding the encryption. In this attack, the interrupt is externally caused while task B is being executed, and the branching is caused from the interrupt processing routine to another malicious task C (not shown) while keeping the privilege mode state of mode 2. In this case, the logic shown in FIG. 8 is employed to make the general-purpose registers used by the application program exclusive with the general-purpose registers used by the interrupt processing routine, and to cause the GRA register to generate nonmaskable interrupt or the like when the access is made to the general-purpose register in the access-prohibited state. This setting can prevent the unexpected external flow of the contents set in the general-purpose registers from the microcomputer when unauthorized access is made to the general-purpose registers that is being used by the application program.

Also, an anti-tamper property of task B can be further improved by the combination with a known technique in which the memory management unit (MMU) and bus control unit (bus controller) (both not shown in FIG. 1) prohibits the access to the memory space in which task B is arranged as well as a nonvolatile memory or the like.

Further, a known technique relating to the virtual register function of the general-purpose register may additionally be combined with the above configuration, the program code of task B may be described to use, e.g., general-purpose registers R1-R5, and general-purpose registers R1-R5 may be allocated to general-purpose registers R10-R14 in the privilege mode in which task B can be executed. The GRA register is set such that general-purpose registers R1-R5 are used exclusively with general-purpose registers R10-R15 in the privilege mode in which task B can be originally executed and the other operation modes. This setting prevents the execution of task B in another operation mode, and can improve the anti-tamper property.

According to the microcomputer of the embodiment, as described above, the privilege level is allocated to each mode so that it becomes possible to achieve, in addition to the effect already described in the first embodiment, the protection of the general-purpose registers used in a higher privilege level and the improvement of the anti-tamper property during the execution of the program particularly relating to the security.

Third Embodiment

A microcomputer according to a third embodiment of the invention is configured to allow setting of the access-allowance and access-prohibition according to the kind of the access to the general-purpose register. The schematic structure of the microcomputer in this embodiment is substantially the same as that already described in the first embodiment. Therefore, detailed description of the same structures and functions will not be repeated.

Figure 15:
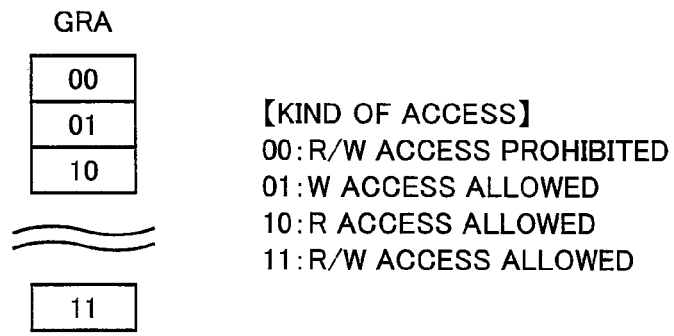
FIG. 15 illustrates a structural example of a GRA register according to a third embodiment of the invention.

FIG. 15 illustrates a structural example of a GRA register according to the third embodiment of the invention. As shown in FIG. 15, two bits of the GRA register correspond to one general-purpose register, and register access allowance determining circuit 33 controls the access to the general-purpose register according to the access attribute signal of 2 bits provided from the GRA register as well as the mode signal provided from mode storage unit 31.

When two bits corresponding to the general-purpose register are "00b" in mode 1, both the reading and writing from/into this general-purpose register are prohibited. When two bits corresponding to the general-purpose register are "01b", only the writing into this general-purpose register is allowed, and the reading is prohibited.

In mode 1, when the two bits corresponding to the general-purpose register are "10b", only the reading from the general-purpose register is allowed, and the writing is prohibited. When the two bits corresponding to the general-purpose register are "11b", both the reading and writing from/into the general-purpose register are allowed.

In mode 2, it may be configured to allow the reading and writing from/into all the general-purpose registers, or may be configured to prohibit the reading and writing from/into the general-purpose registers for which both the reading and writing were allowed in mode 1, and to allow the reading and writing from/into the other general-purpose registers.

According to the microcomputer of the embodiment, as described above, the access allowance and the access prohibition are selectively set according to the kind of the access to the general-purpose register so that it can implement the finer register protection function corresponding to the features or characteristics of the application and the system in addition to the effect already described in the first embodiment.

Fourth Embodiment

A microcomputer according to a fourth embodiment of the invention has the general-purpose registers in a grouped form, and is configured to select, in mode 1, the group of the general-purpose registers to which access is to be allowed. The schematic structure and the like of the microcomputer of this embodiment are substantially the same as that in the first embodiment already described, and therefore detailed description of the same structures and functions will not be repeated.

Figure 16:
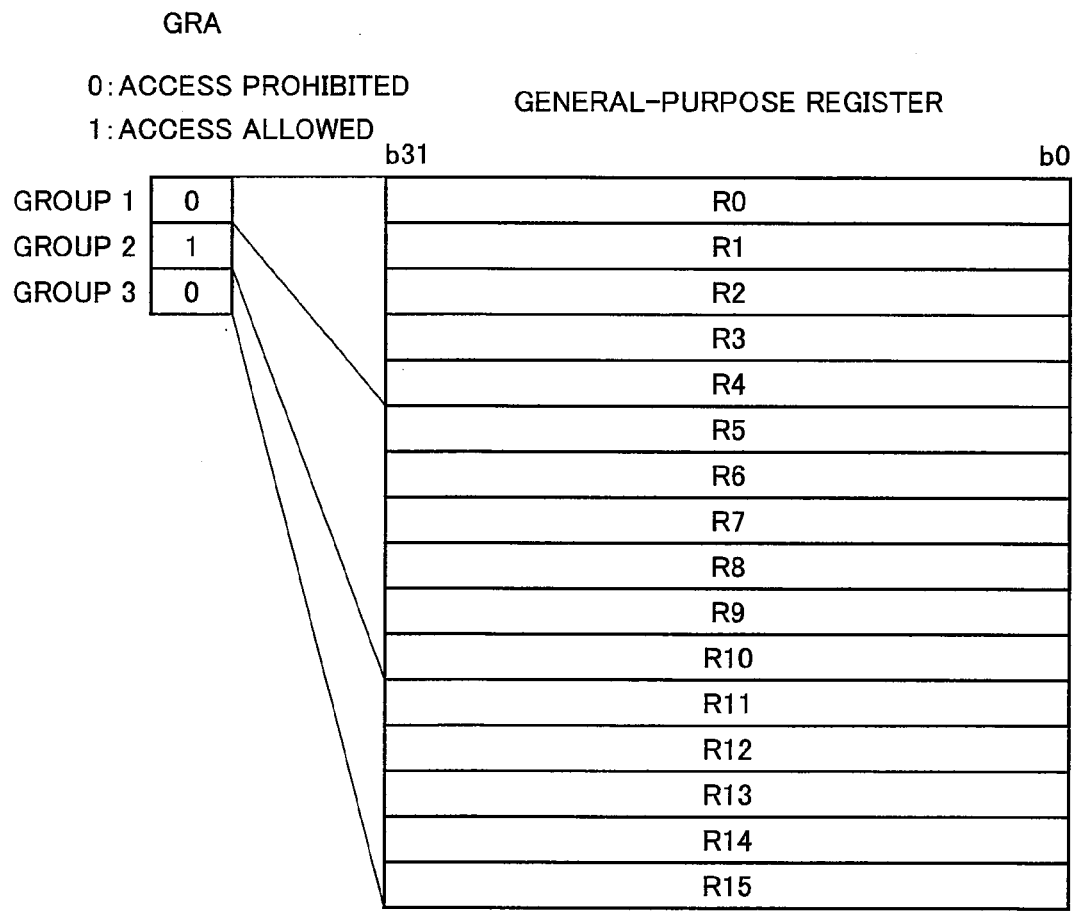
FIG. 16 illustrates a structural example of a GRA register according to a fourth embodiment of the invention.

FIG. 16 illustrates a structural example of a GRA register according to a fourth embodiment of the invention. As shown in FIG. 16, one bit in the GRA register corresponds to one group, and the microcomputer allows the access to the general-purpose registers belonging to the group that corresponds to the bits set to "1". A group 1 includes general-purpose registers R0-R4, a group 2 includes general-purpose registers R5-R10 and a group 3 includes general-purpose registers R11-R15. The general-purpose registers included in each group are preset.

Register access allowance determining circuit 33 controls the access to the general-purpose registers according to the access attribute signal of 3 bits provided from the GRA register and the mode signal provided from mode storage unit 31.

In mode 1, when the bit corresponding to the group 1 is "1", the access to general-purpose registers R0-R4 is allowed, and the access to the other general-purpose registers is prohibited. When the bit corresponding to the group 2 is "1", the access to general-purpose registers R5-R10 is allowed, and the access to the other general-purpose registers is prohibited. When the bit corresponding to the group 3 is "1", the access to general-purpose registers R11-R15 is allowed, and the access to the other general-purpose registers is prohibited.

Mode 2 may be configured to allow the access to all the general-purpose registers, or may be configured to prohibit the access to the general-purpose registers to which access was allowed in mode 1 and to allow the access to the general-purpose registers to which access was prohibited in mode 1.

As described above, the microcomputer according to this embodiment is configured to group the general-purpose registers, and to select the specific group including the general-purpose registers to which access is to be allowed so that the embodiment can implement the finer register protection function according to the features or characteristics of the application and system, in addition to the effect already described in the first embodiment.

Fifth Embodiment

A microcomputer according to a fifth embodiment of the invention is configured such that it can set the allowance/prohibition of the access to the general-purpose registers in units of variable lengths of n bits such as in units of bytes. As an example, description will now be given on the case where the allowance/prohibition of the access to the general-purpose registers is set in units of bytes. The schematic structure and the like of the microcomputer according to this embodiment are the same as those already described in the first embodiment. Therefore, detailed description of the same structures and functions will not be repeated.

Figure 17:
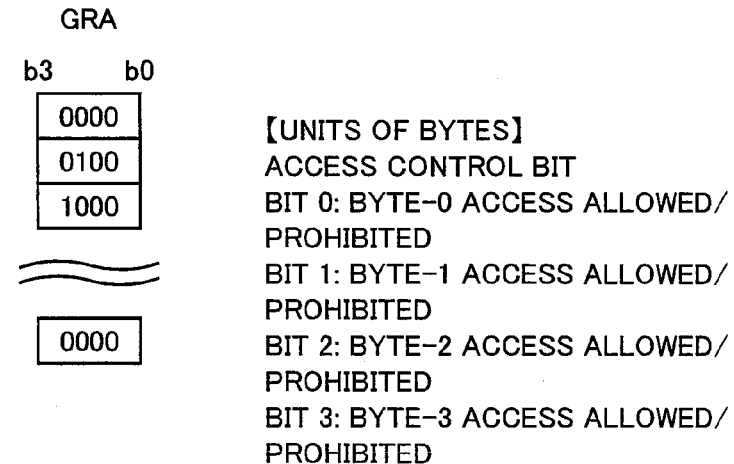
FIG. 17 illustrates a structural example of a GRA register according to a fifth embodiment of the invention.

FIG. 17 illustrates an example of a structure of a GRA register in the fifth embodiment of the invention. As shown in FIG. 17, four bits of the GRA register correspond to one general-purpose register, and register access allowance determining circuit 33 controls the access to the general-purpose registers according to the access attribute signal of 4 bits provided from the GRA register and the mode signal provided from mode storage unit 31.

In mode 1, when the bit 0 among the 4 bits corresponding to the general-purpose register is "0", the access to the byte 0 of this general-purpose register is prohibited, and the access to the byte 0 of this general-purpose register is allowed when the bit 0 is "1". When the bit 1 among the 4 bits corresponding to the general-purpose register is "0", the access to the byte 1 of the general-purpose register is prohibited, and the access to the byte 1 of this general-purpose register is allowed when the bit 1 is "1". When the bit 2 among the 4 bits corresponding to the general-purpose register is "0", the access to the byte 2 of the general-purpose register is prohibited, and the access to the byte 2 of this general-purpose register is allowed when the bit 2 is "1". When the bit 3 among the 4 bits corresponding to the general-purpose register is "0", the access to the byte 3 of the general-purpose register is prohibited, and the access to the byte 3 of this general-purpose register is allowed when the bit 3 is "1".

Mode 2 may be configured to allow the access to all the bytes of all the general-purpose registers, and or may be configured to prohibit the access to the bytes of the general-purpose registers to which access was allowed in mode 1, and to allow the access to the bytes other than the above.

As described above, since the microcomputer of this embodiment can set the allowance/prohibition of the access to the general-purpose register performed in units of variable length of n bits, it can implement the finer register protection function corresponding to the features or characteristics of the application and system in addition to the effect already described in the first embodiment.

Sixth Embodiment

A microcomputer according to a sixth embodiment of the invention is configured as follows. When a plurality of processor modes are employed, the microcomputer can set the allowance/prohibition of the access to the general-purpose register for each of the hierarchical privilege levels. The schematic structure and the like of the microcomputer of this embodiment are the same as those already described in the first embodiment. Therefore, detailed description of the same structures and functions will not be repeated.

Figure 18:
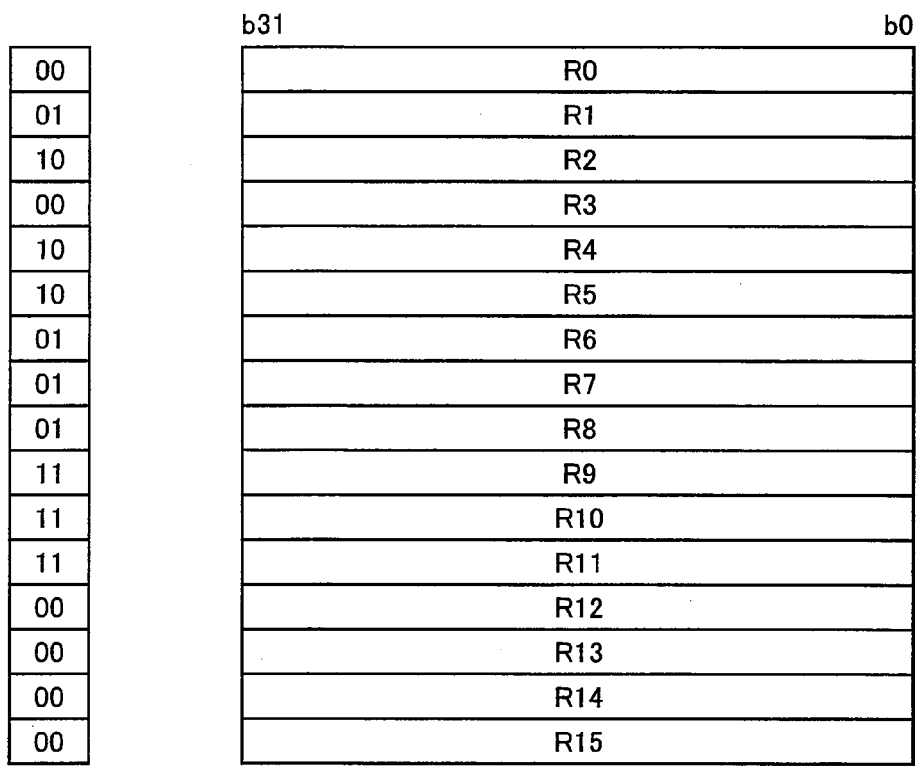
FIG. 18 illustrates a structural example of a GRA register according to a sixth embodiment of the invention.

FIG. 18 illustrates an example of a structure of a GRA register in the sixth embodiment of the invention. As shown in FIG. 18, two bits of the GRA register correspond to one general-purpose register, and register access allowance determining circuit 33 controls the access to the general-purpose register according to the access attribute signal of 2 bits provided from the GRA register and the mode signal provided from mode storage unit 31. In this embodiment, mode storage unit 31 has stored the current privilege level, and provides it as the mode signal to register access allowance determining circuit 33.

When the two bits corresponding to the general-purpose register are "00b", only the ring 0 (privilege level 0) is allowed to access this general-purpose register, and the access from the other rings is prohibited.

When the two bits corresponding to the general-purpose register are "01 b", only the rings 0 and 1 (privilege levels 0 and 1) are allowed to access this general-purpose register, and the access from the other ring is prohibited.

When the two bits corresponding to the general-purpose register are "10b", only the rings 0 to 2 (privilege levels 0 to 2) are allowed to access this general-purpose register, and the access from the other ring is prohibited.

When the two bits corresponding to the general-purpose register are "11b", all the rings (privilege levels 0 to 3) are allowed to access this general-purpose register.

As described above, since the microcomputer of this embodiment can set the allowance/prohibition of the access to the general-purpose register for each hierarchical privilege level, it can implement the finer register protection function corresponding to the features or characteristics of the application and system in addition to the effect already described in the first embodiment.

Seventh Embodiment

The first to sixth embodiments have been described in the case where the general-purpose registers to be access-allowed are selected according to the mode. Thus, the number of the general-purpose registers to which access is allowed may decrease depending on the mode. Therefore, it is possible to decrease the number of bits of the register-designation field in the instruction code. A microcomputer according to the seventh embodiment of the invention can use an unused register-designation field for different meaning, and can interpret the instruction code of the same bit pattern as another instruction depending on the mode when it executes the instruction.

The schematic structure of the microcomputer according to the embodiment as well as a logical structure of register access allowance determining circuit 33 and the like are the same as those already described in the first to sixth embodiments. Therefore, detailed description of the same structures and functions will not be repeated.

FIGS. 19A and 19B illustrate an example of the case where the instruction code of the same bit patter can be interpreted as another instruction depending on the mode. FIG. 19A illustrates an example of the instruction code that is executed in the mode using all the 16 general-purpose registers. Four bits are allocated to each of the first and second operands (R1 and R2), and the instruction code is interpreted as an ADD instruction (addition instruction).

FIG. 19B illustrates an example of the instruction code that is executed in the mode restricting the number of the general-purpose registers to be used to eight. Three bits are allocated to each of the first and second operands (R1 and R2). As compared with FIG. 19A, an operation code field can be increased by two bits, and more instruction codes can be supported. In this mode, the instruction code is interpreted as a MUL instruction (multiplication instruction).

FIG. 20 shows an example of a structure of an instruction decode unit in the microcomputer according to the seventh embodiment of the invention. Instruction decode unit 12 includes an instruction decode input latch circuit 41, a control logic circuit 42, an instruction decoder (mode 1) 43, an instruction decoder (mode 2) 44 and a selector 45.

Instruction decode input latch circuit 41 is controlled by control logic circuit 42 to latch an instruction code fetched by instruction fetch unit 11 and provide it to instruction decoders 43 and 44.

Instruction decoder 43 decodes the instruction code provided from instruction decode input latch circuit 41 by interpreting it as an instruction code corresponding to mode 1, and provides a result of the decoding to selector 45.

Instruction decoder 44 decodes the instruction code provided from instruction decode input latch circuit 41 by interpreting it as an instruction code corresponding to mode 2, and provides a result of the decoding to selector 45.

According to the mode signal provided from mode storage unit 31, selector 45 selectively provides the decode result received from instruction decoder 43 or the decode result received from instruction decoder 44 to control unit 13.

Control logic circuit 42 detects the completion of the decoding according to the decode result signal provided from selector 45, and controls instruction decode input latch circuit 41 to take in the next instruction code from instruction fetch unit 11.

According to the microcomputer of the embodiment, as described above, the unused register-designation field is used in another meaning, and the instruction code of the same bit pattern may be interpreted as another instruction depending on the mode. Therefore, only the number of the supported instructions can be increased without changing the number of the bits of the instruction code.

Since the frequency of use of the instructions depends on the details of each processing item, an instruction group to be used only in the specific processing can be supported by a portion of the register-designating field where the bits are reduced in number. Therefore, the code efficiency can be improved.

Eighth Embodiment

In a microcomputer according to an eighth embodiment of the invention, control registers such as a GRA register are mapped in the address space. The schematic structure of the microcomputer as well as the logical structure of register access allowance determining circuit 33 and the like are the same as those already described in the first to seventh embodiments. Therefore, detailed description of the same structures and functions will not be repeated.

Figure 21:
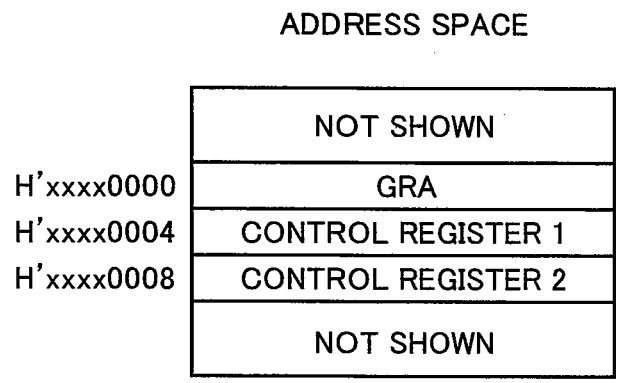
FIG. 21 shows mapping of control registers in an address space.

FIG. 21 shows mapping of the control registers in the address space. As shown in FIG. 21, a GRA register is mapped at "H'xxxx0000" of the address space, a control register 1 is mapped at "H'xxxx0004" and a control register 2 is mapped at "H'xxxx0008".

As described above, the microcomputer according to the embodiment is configured to map the GRA register in the address space so that it can easily perform the access control of the general-purpose register by an MOV instruction and the like, in addition to the effect already described in the first embodiment.

Ninth Embodiment

A microcomputer according to a ninth embodiment of the invention is configured to allow setting of the GRA information from an outside of a CPU. The schematic structure of the microcomputer as well as the logical structure of register access allowance determining circuit 33 and the like are the same as those already described in the first to eighth embodiments. Therefore, detailed description of the same structures and functions will not be repeated.

Figure 22:
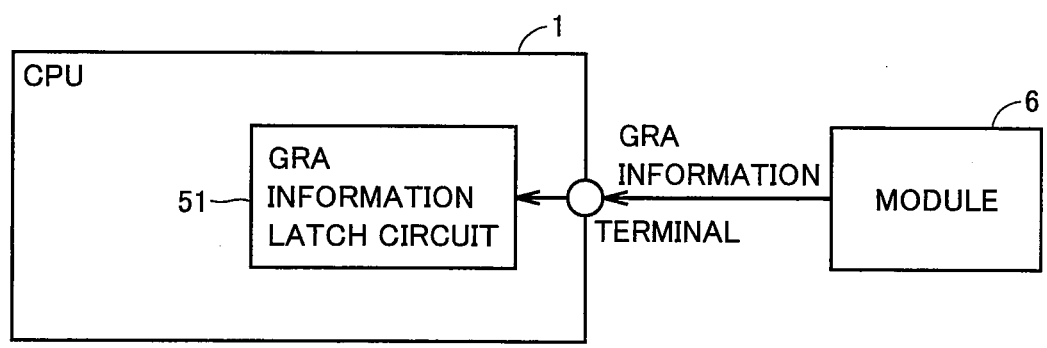
FIG. 22 shows a structural example of the microcomputer according to a ninth embodiment of the invention.

FIG. 22 shows a structural example of the microcomputer according to the ninth embodiment of the invention. CPU 1 includes a GRA information latch circuit 51. GRA information latch circuit 51 receives the GRA information from a module 6 through a terminal and latches it. The GRA information latched by GRA information latch circuit 51 is transferred to GRA register 32 shown in FIG. 6.

According to the microcomputer of the embodiment, since the GRA information can be set from the outside of the CPU, the GRA information can be set further easily, in addition to the effect already described in connection with the first embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A microcomputer including a processor for executing instructions, and comprising:
   a control unit for controlling execution of the instruction according to results of decoding of instruction codes;
   a first bus;
   a second bus;
   a general-purpose register file coupled between the first bus and the second bus and including a plurality of general-purpose registers;
   an operation unit coupled between the first bus and the second bus and configured to receive data to be processed from the general-purpose register file and to output an operation result to the general-purpose register file;
   an access attribute storage unit for storing an access attribute for each of said plurality of general-purpose registers;
   a mode storage unit for storing a mode for controlling an operation of said processor; and
   an access determining unit for determining, when a request for access to a general-purpose register of the plurality of general-purpose registers is made by said control unit, whether access to the general-purpose register is to be allowed or not, depending on the access attribute stored in said access attribute storage unit and the mode stored in said mode storage unit
   wherein when an exception request occurs, the access attribute stored in said access attribute storage unit is saved in another storage area, and the mode stored in said mode storage unit is changed.

2. The microcomputer according to claim 1, wherein said access determining unit provides an exception request to said control unit when the access to the general-purpose register is not allowed.

3. The microcomputer according to claim 1, wherein said access determining unit allows only the access to the general-purpose register of which access allowance is set by the access attribute stored in said access attribute storage unit, when the mode stored in said mode storage unit is a first mode, and
   allows the access to all the general-purpose registers when the mode stored in said mode storage unit is a second mode.

4. The microcomputer according to claim 1, wherein said access determining unit allows only the access to the general-purpose register of which access allowance is set by the access attribute stored in said access attribute storage unit, when the mode stored in said mode storage unit is a first mode, and
   allows only the access to the general-purpose register of which access prohibition is set by the access attribute stored in said access attribute storage unit, when the mode stored in said mode storage unit is a second mode.

5. A microcomputer including a processor for executing an instruction while accessing a plurality of general purpose registers, and comprising:
   a control unit for controlling execution of the instruction according to a result of decoding of an instruction code;
   an access attribute storage unit for storing an access attribute for each of said plurality of general purpose registers;
   a mode storage unit for storing a mode for controlling an operation of said processor; and
   an access determining unit for determining whether access to the general purpose register is to be allowed or not, depending on the access attribute stored in said access attribute storage unit and the mode stored in said mode storage unit, when a request for the access to the general purpose register is made by said control unit,
   wherein when an exception request occurs, the access attribute stored in said access attribute storage unit is saved in another storage area, and the mode stored in said mode storage unit is changed.

6. The microcomputer according to claim 5, wherein said access determining unit provides an exception request to said control unit when the access to the general-purpose register is not allowed.

7. The microcomputer according to claim 5, wherein said access determining unit allows only the access to the general-purpose register of which access allowance is set by the access attribute stored in said access attribute storage unit, when the mode stored in said mode storage unit is a first mode, and
   allows the access to all the general-purpose registers when the mode stored in said mode storage unit is a second mode.

8. The microcomputer according to claim 5, wherein
   said access determining unit allows only the access to the general-purpose
   register of which access allowance is set by the access attribute stored in said access attribute storage unit, when the mode stored in said mode storage unit is a first mode, and
   allows only the access to the general-purpose register of which access prohibition is set by the access attribute stored in said access attribute storage unit, when the mode stored in said mode storage unit is a second mode.

9. The microcomputer according to claim 7, wherein
   said first mode corresponds to a user mode, and said second mode corresponds to a supervisor mode.

10. The microcomputer according to claim 7, wherein
    said first mode corresponds to a mode for executing an application program, and
    said second mode corresponds to a mode for executing an interrupt processing routine.

11. The microcomputer according to claim 7, wherein
    said processor has a plurality of privilege levels, and
    a part of said plurality of privilege levels are allocated to said first mode, and the other privilege levels are allocated to said second mode.

12. The microcomputer according to claim 5, wherein
    said access attribute storage unit stores a kind of the access allowed to each of said plurality of general-purpose registers, and
    when said control unit makes the request for the access to the general-purpose register, said access determining unit determines whether the access to the general-purpose register is to be allowed or not, depending on the kind of the allowed access stored in said access attribute storage unit and the mode stored in said mode storage unit.

13. The microcomputer according to claim 5, wherein
said plurality of general-purpose registers are divided into a plurality of groups, said access attribute storage unit stores a group selected from among said
plurality of groups for allowing the access, and
when said control unit makes the request for the access to the general-purpose register, said access determining unit determines whether the access to the general-purpose register is to be allowed or not, depending on the group stored, for allowing the access, in said access attribute storage unit and the mode stored in said mode storage unit.

14. The microcomputer according to claim 5, wherein
said access attribute storage unit stores, for each of said plurality of general-purpose registers, a predetermined unit of data to which access is to be allowed, and
when said control unit makes the request for the access to the general-purpose register, said access determining unit determines whether the access to the general-purpose register is to be allowed or not, depending on information stored in said access attribute storage unit and relating to the predetermined unit of the data for allowing the access, and the mode stored in said mode storage unit.

15. The microcomputer according to claim 5, wherein
said processor has a plurality of privilege levels,
said access attribute storage unit stores, for each of said plurality of general-purpose registers, the privilege level from which access is to be allowed, and
when said control unit makes the request for the access to the general-purpose register, said access determining unit determines whether the access to the general-purpose register is to be allowed or not, depending on information stored in said access attribute storage unit and relating to the privilege level for allowing the access, and the mode stored in said mode storage unit.

16. The microcomputer according to claim 5, further comprising:
a first decoder for decoding the instruction code by interpreting the instruction code as an instruction code corresponding to a first mode;
a second decoder for decoding the instruction code by interpreting the instruction code as an instruction code corresponding to a second mode; and
a selector for selectively providing a decode result of said first decoder and a decode result of said second decoder to said control unit, depending on the mode stored in said mode storage unit.

17. The microcomputer according to claim 16, wherein
said first decoder performs the decoding by interpreting as an operation code a part of a portion which is included in the instruction code and is interpreted by said second decoder as a register-designation field.

18. The microcomputer according to claim 5, wherein
said access attribute storage unit is mounted as a control register.

19. The microcomputer according to claim 5, wherein
said access attribute storage unit is mapped in an address space.

20. The microcomputer according to claim 5, wherein
said access attribute storage unit stores information received from an outside of said processor.

* * * * *